(12) United States Patent
Macy

(10) Patent No.: US 9,256,907 B2
(45) Date of Patent: *Feb. 9, 2016

(54) MULTIPLE FIELD BOUNDARY DATA SETS IN AN AUTOMATED CROP RECORDKEEPING SYSTEM

(71) Applicant: MAPSHOTS, INC., Cumming, GA (US)

(72) Inventor: Ted S. Macy, Cumming, GA (US)

(73) Assignee: MAPSHOTS INC

( * ) Notice: Subject to any disclaimer, the term of this patent is extended or adjusted under 35 U.S.C. 154(b) by 0 days.

This patent is subject to a terminal disclaimer.

(21) Appl. No.: 14/713,100

(22) Filed: May 15, 2015

(65) Prior Publication Data

US 2015/0269686 A1 Sep. 24, 2015

Related U.S. Application Data

(63) Continuation of application No. 12/640,170, filed on Dec. 17, 2009, now Pat. No. 9,084,389.

(51) Int. Cl.

| G06F 7/00 | (2006.01) |
|---|---|
| G06F 17/30 | (2006.01) |
| G06Q 50/02 | (2012.01) |
| A01B 79/00 | (2006.01) |
| G06Q 40/00 | (2012.01) |
| G06Q 30/00 | (2012.01) |

(52) U.S. Cl.
CPC .............. *G06Q 50/02* (2013.01); *A01B 79/005* (2013.01); *G06Q 30/018* (2013.01); *G06Q 40/12* (2013.12)

(58) Field of Classification Search
CPC ..... A01B 79/005; G06Q 50/02; G06Q 40/12; G06F 17/30554
See application file for complete search history.

(56) References Cited

U.S. PATENT DOCUMENTS

| RE31,023 E | 9/1982 | Hall, III |
|---|---|---|
| 5,699,244 A | 12/1997 | Clark, Jr. et al. |
| 5,771,169 A | 6/1998 | Wendte |
| 5,870,689 A | 2/1999 | Hale et al. |
| 5,878,371 A | 3/1999 | Hale et al. |
| 5,897,619 A | 4/1999 | Hargrove et al. |
| 5,902,343 A | 5/1999 | Hale et al. |
| 5,978,723 A | 11/1999 | Hale et al. |
| 6,236,907 B1 | 5/2001 | Hauwiller et al. |
| 6,606,542 B2 | 8/2003 | Hauwiller et al. |
| 6,687,616 B1 | 2/2004 | Peterson et al. |
| 7,039,592 B1 | 5/2006 | Yegge et al. |
| 7,107,285 B2 | 9/2006 | Von Kaenel et al. |
| 7,991,754 B2 | 8/2011 | Maizel et al. |
| 2002/0022929 A1 | 2/2002 | Ell |

(Continued)

FOREIGN PATENT DOCUMENTS

| WO | 01/52160 A1 | 7/2001 |
|---|---|---|
| WO | 2007/067579 A2 | 6/2007 |

*Primary Examiner* — Marc Somers

(57) ABSTRACT

A method includes defining a plurality of crop field boundaries such that an area of land falls within each of the plurality of field boundaries. The method further includes maintaining the plurality of crop field boundaries within the crop recordkeeping system, using a first of the crop field boundaries in performing a first function of the crop recordkeeping system executing on a computer, and using a second of the crop field boundaries in performing a second function of the crop recordkeeping system executing on the computer.

10 Claims, 6 Drawing Sheets

(56) References Cited

U.S. PATENT DOCUMENTS

| | | |
|---|---|---|
| 2002/0040300 A1 | 4/2002 | Ell |
| 2002/0173979 A1 | 11/2002 | Daggett et al. |
| 2002/0173980 A1 | 11/2002 | Daggett et al. |
| 2003/0036852 A1 | 2/2003 | Ell et al. |
| 2003/0208319 A1 | 11/2003 | Ell et al. |
| 2005/0096849 A1 | 5/2005 | Sorrells |
| 2006/0282467 A1 | 12/2006 | Peterson et al. |
| 2007/0174095 A1 | 7/2007 | McComb et al. |
| 2009/0089254 A1 | 4/2009 | Von Kaenel et al. |
| 2009/0313215 A1 | 12/2009 | Maizel et al. |

US 9,256,907 B2

MULTIPLE FIELD BOUNDARY DATA SETS IN AN AUTOMATED CROP RECORDKEEPING SYSTEM

RELATED APPLICATION

This application claims the benefit of U.S. patent application Ser. No. 12/640,170, filed on Dec. 17, 2009, and issued as U.S. Pat. No. 9,084,389 on Jul 21, 2015.

FIELD OF THE INVENTION

The present invention relates to crop recordkeeping. More particularly, but not exclusively, the present invention relates to crop recordkeeping which maintains multiple different boundaries associated with one or more crop fields.

BACKGROUND OF THE INVENTION

There is widespread use of maps and Global Positioning System (GPS) data in agriculture. Yet problems remain. Of particular interest is how to best use available data such as production data in a crop recordkeeping system. One problem which is encountered relates to the use of a field boundary. Historical practices have relied on a fixed field boundary in keeping records and creating reports. The fixed field boundary may based on hand mapped GPS data, historical U.S. Geological Survey maps and land ownership maps.

What is needed is a crop recordkeeping system which allows for maintaining a plurality of different boundaries in order to be selectively used in supporting various crop recordkeeping and related functions.

BRIEF SUMMARY OF THE INVENTION

Instead of attempting to establish permanent field boundaries, it is recognized that there is the potential for advantages in various contexts where multiple field boundaries are obtained. According to one aspect, a method includes defining a plurality of crop field boundaries such that an area of land falls within each of the plurality of field boundaries. The method further includes maintaining the plurality of crop field boundaries within the crop recordkeeping system, using a first of the crop field boundaries in performing a first function of the crop recordkeeping system executing on a computer, and using a second of the crop field boundaries in performing a second function of the crop recordkeeping system executing on the computer.

According to another aspect, a crop recordkeeping system includes a crop recordkeeping system executing on a computer, wherein the crop recordkeeping system provides for (a) defining a plurality of crop field boundaries such that an area of land falls within each of the plurality of field boundaries, the plurality of field boundaries comprising a first crop field boundary and a second crop field boundary, (b) maintaining the plurality of crop field boundaries within the crop recordkeeping system, (c) using the first crop field boundary in performing a first function of the crop recordkeeping system executing on a computer, and (d) using the second crop field boundary in performing a second function of the crop recordkeeping system executing on the computer.

According to another aspect, a method of managing data in crop recordkeeping software executing on a computer includes defining a plurality of crop field boundaries such that an area of land falls within each of the plurality of field boundaries, the plurality of field boundaries comprising a first crop field boundary and a second crop field boundary, maintaining the plurality of crop field boundaries within the crop recordkeeping system, and using the plurality of crop field boundaries in performing functions of the crop recordkeeping software executing on the computer.

DETAILED DESCRIPTION OF THE PREFERRED EMBODIMENT

In crop recordkeeping systems, field production records can be tied geospatially to a field. There is a boundary associated with the field. However, reporting frequently needs to be performed at different spatial extents depending on the use of the information. Multiple boundary sets may be used to keep records and run reports. Different types of boundary sets may include, without limitation, production boundaries, regulatory boundaries, and business boundaries. The use of multiple boundary sets allows a crop recordkeeping system to more accurately produce reports of various types in response to a producer's needs.

A computer with a crop recordkeeping system which is in operative communication with a data store containing a plurality of boundary sets is disclosed. The computer has a crop recordkeeping system. The crop recordkeeping system may be one or more software applications executing on the computer and may be stored on a computer readable storage medium of the computer. The computer also has an associated display. There is a data store in operative communication with the computer. The data store may contain data in the form of one or more production boundary set(s), one or more regulatory boundary data set(s), and/or one or more business boundary set(s).

Figure 1A:
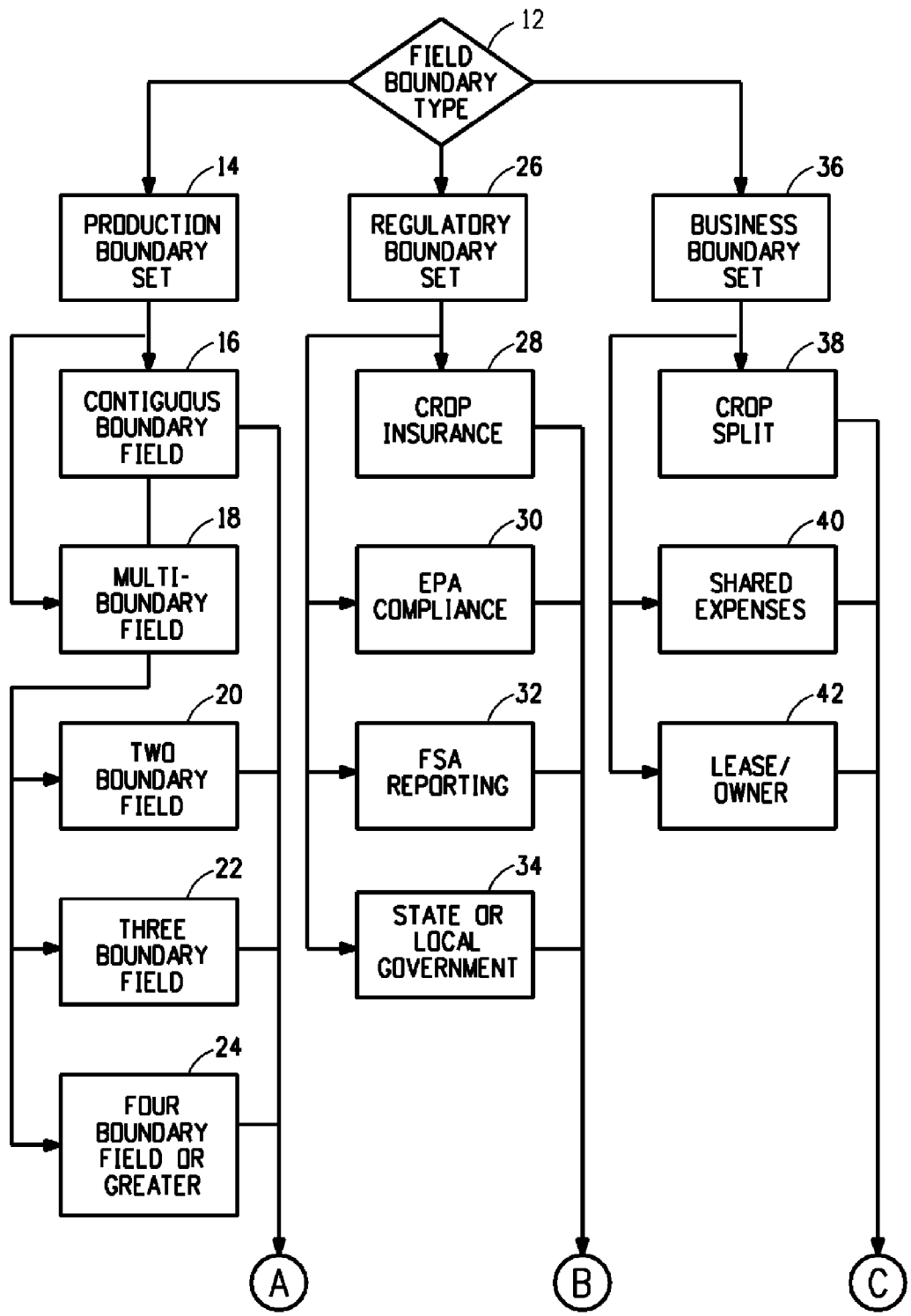
FIG. 1A and FIG. 1B provide a flow chart illustrating one example of a methodology.
Figure 1B:
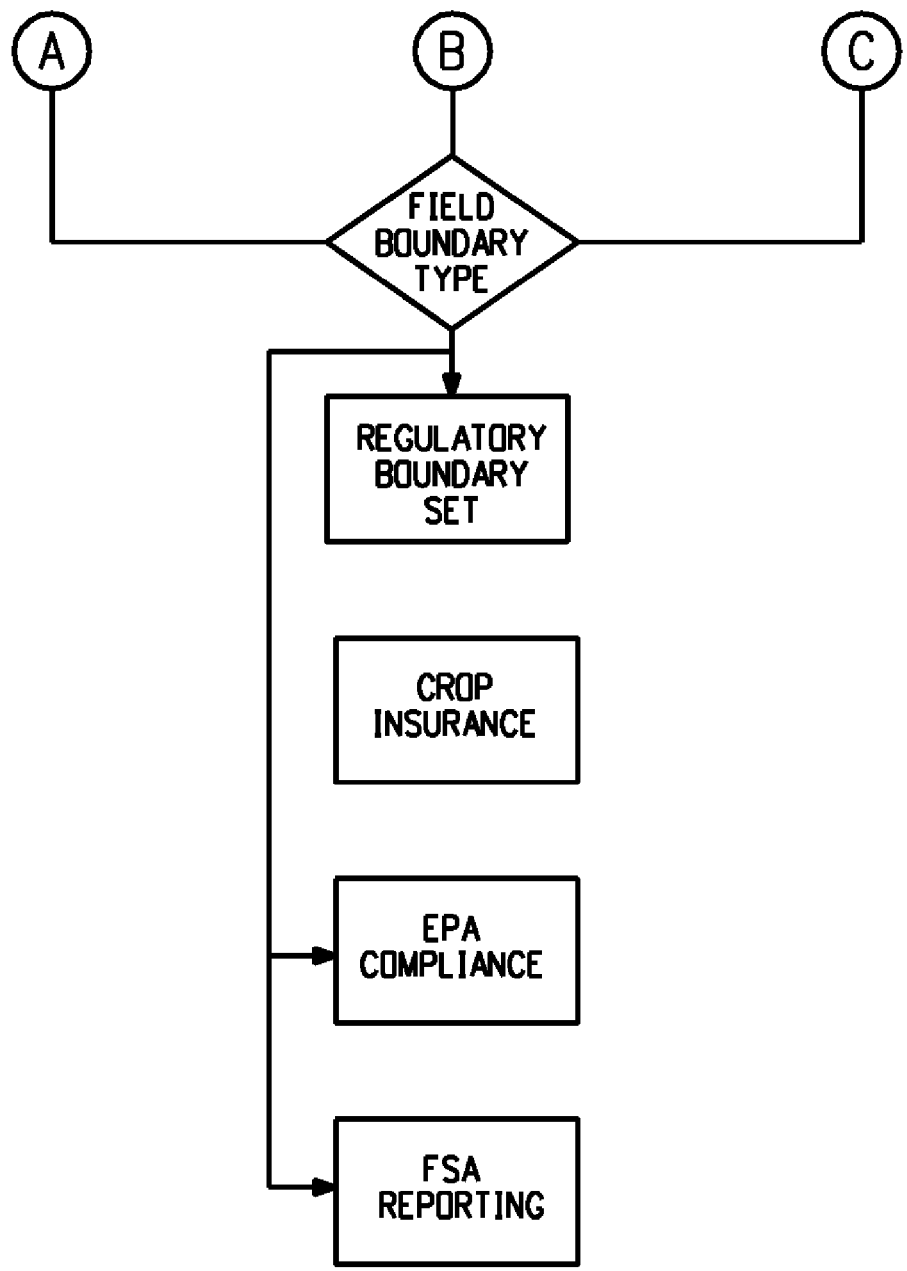

FIG. 1A and FIG. 1B provide one example of a method associated with maintaining separate boundary definitions. The field boundary set 12 decision block allows a user to select one of three or more types of boundaries, including a production boundary 14, a regulatory boundary 26, and a business boundary 36. The method allows for one or more production related boundary sets 14 to be used for record keeping and reporting. These can include a contiguous boundary field 16 and multi-boundary field 18. The multi-boundary field 18 can include a two boundary field 20, a three boundary field 22 or a production boundary data set with four or more fields 24.

It is contemplated that in crop production there may be breaks in the operations performed in a field which may be described using multiple boundary sets for a field. For example, if a ditch traverses a block of land, a producer may farm both sides of the ditch. Thus, in such an instance the field may be considered a multi-boundary field, or alternatively, the producer may consider there to be two separate fields. Similarly, a producer may have two or more different types of crops within the same field and may want to define separate boundaries for each type of crop.

In addition to production boundary sets, the producer may specify a regulatory boundary set 26 to be used for record keeping and reporting. These can include a crop insurance boundary field 28, an Environmental Protection Agency (EPA) compliance boundary field 30, a Farm Service Agency (FSA) boundary field 32 and a state or local government boundary field 34.

Also, the producer may specify one or more business boundary sets 36 to be used for record keeping and reporting. These can include a crop split field boundary 38, a shared expenses field boundary 40 and an owner/lease field boundary 42, or other type of business boundaries.

Although various examples are provided regarding reasons why a producer may choose to use a particular field boundary type for a particular purpose or in performing a particular function, it is to be understood that one advantage of having multiple field boundary sets is that a producer may be flexible in assigning field boundaries to suit the producer's purposes.

Figure 2A:
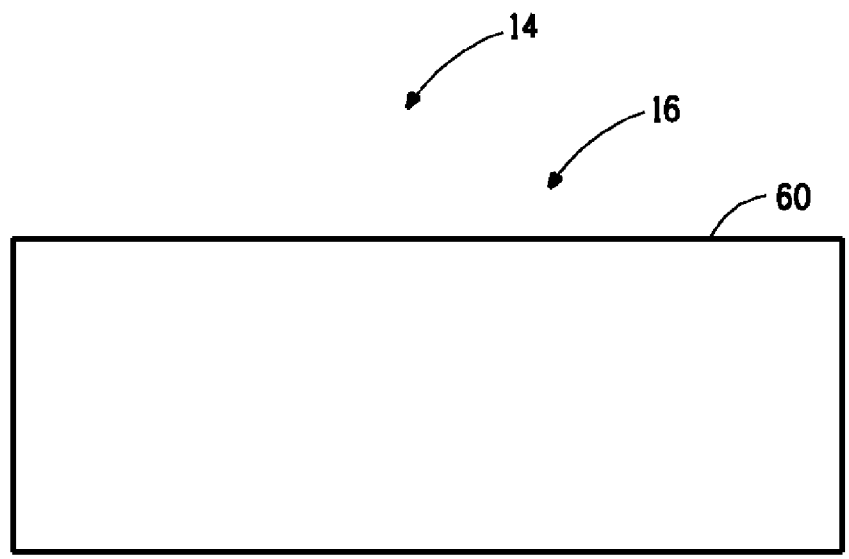
FIG. 2A and FIG. 2B show examples of a production boundaries.
Figure 2B:
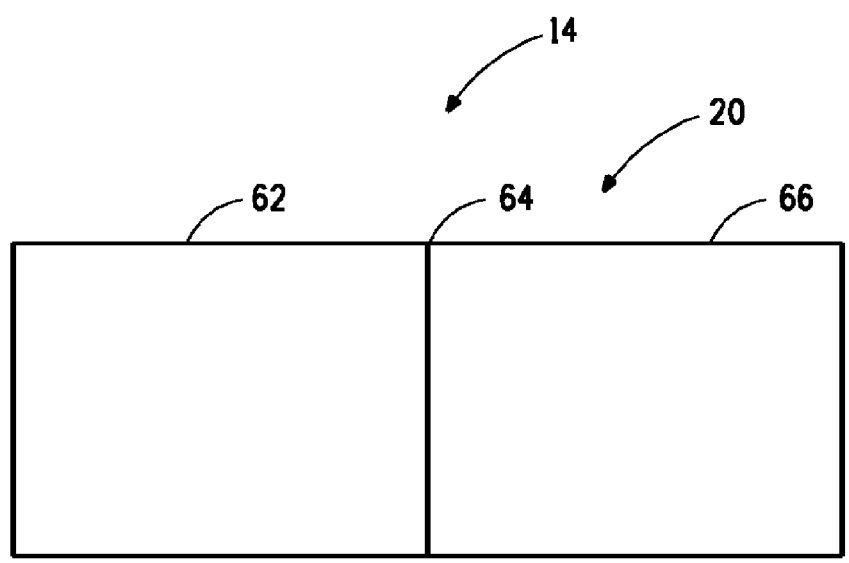

Production boundaries may be used to display and report on how a piece of land is farmed. One example is shown in FIG. 2A to FIG. 2B. In FIG. 2A, a 160 acre section 60 is shown. A production boundary 14, which is a contiguous boundary field 16 is for the 160 acre section 60. Here, a producer may farm a 160 acre section 60 as one contiguous piece of ground. As shown in FIG. 2B, the producer may farm across an old fencerow 64 even though the producer owns one 80 acre section 62 and rents the other 80 acre section 66 from a landlord. Thus, the production boundary 60 associated with the piece of land is different from the ownership boundaries 62, 64. The producer utilizes the land this way because it may be more efficient than to farm sections 62 and 64 as separate tracts of land. For example, fewer passes with equipment may provide for fuel savings and other efficiencies than farming the "two" fields as a single field. Thus, in such an instance the production boundary set 14 differs from the business boundary set 36.

Figure 3A:
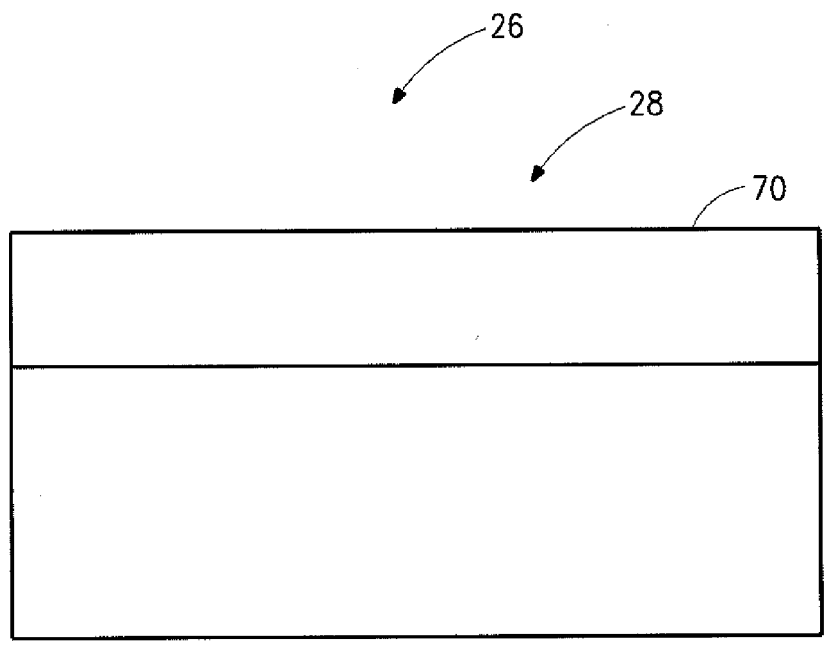
FIG. 3A and FIG. 3B show examples of regulatory boundaries.
Figure 3B:
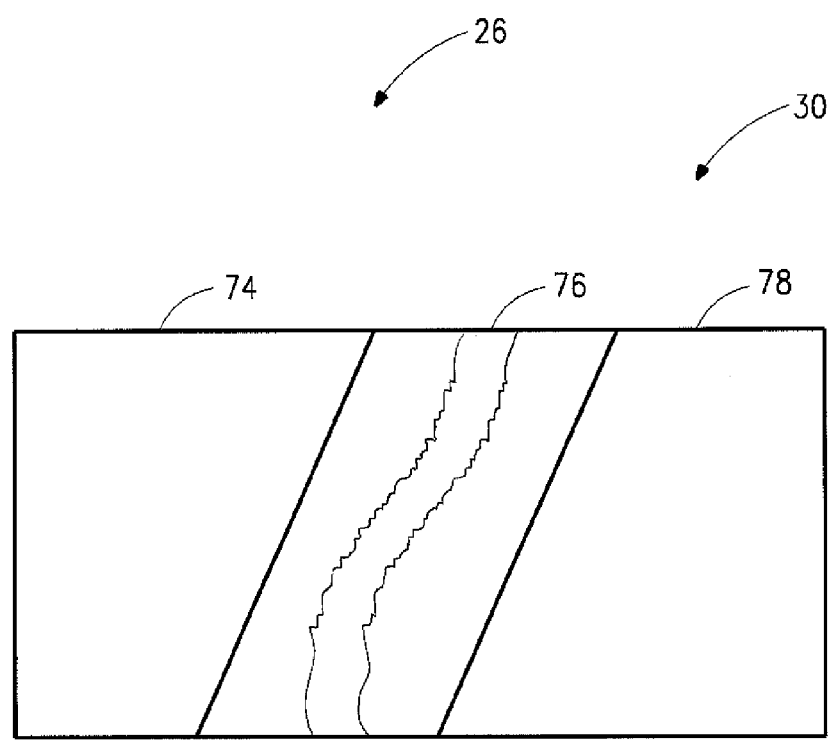

Regulatory boundaries may be used to report crop insurance, document EPA compliance, FSA reporting, or state or local government compliance, or other types of regulations. These boundaries may be different than the production boundaries as can be seen in the examples of FIG. 3A to FIG. 3B. As shown in FIG. 3A, a production boundary 26, which is a contiguous boundary field 28 is shown. A township line 70 is shown which traverses the contiguous boundary field 28. There may be different insurance rates associated with these different townships. Thus, it is advantageous to the producer to be able to separate a production field into two different fields based on the relationship with the township. Alternatively, the producer may need to pay the higher insurance rate even though a portion of the production field falls within a township with a lower insurance rate. A first crop insurance boundary field and a second crop insurance boundary field are shown. Thus, the crop recording keeping system allows a producer to maintain separate boundary sets for a piece of land.

FIG. 3B illustrates regulatory boundary data for EPA compliance 30. Erosion control practices may be used for agricultural operations to control runoff and reduce the amount of soil erosion caused by that runoff. Land tracts 74 and 78 are divided by a creek 76. Non crop tracts may create a buffer zone between the land tracts 74 and 78 from creek 76 thus assisting in preventing excess runoff. Thus, for EPA compliance purposes, it may be useful to maintain EPA compliance boundaries.

Figure 4A:
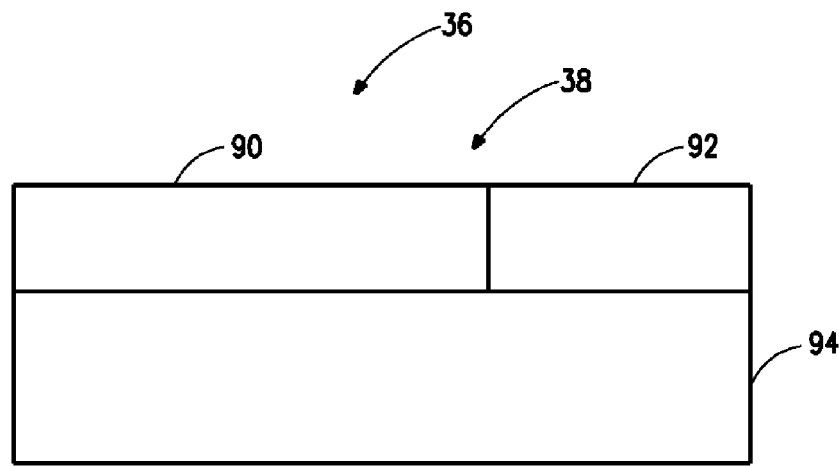
FIG. 4A and FIG. 4B show examples of business boundaries.

Business boundaries 36 may define financial relationships associated with tracts of land. One example of a crop split field 38 is shown in FIG. 4A, which illustrates three separate tracts 90, 92 and 94 within field 38 which has different seed corn varieties.

Figure 4B:
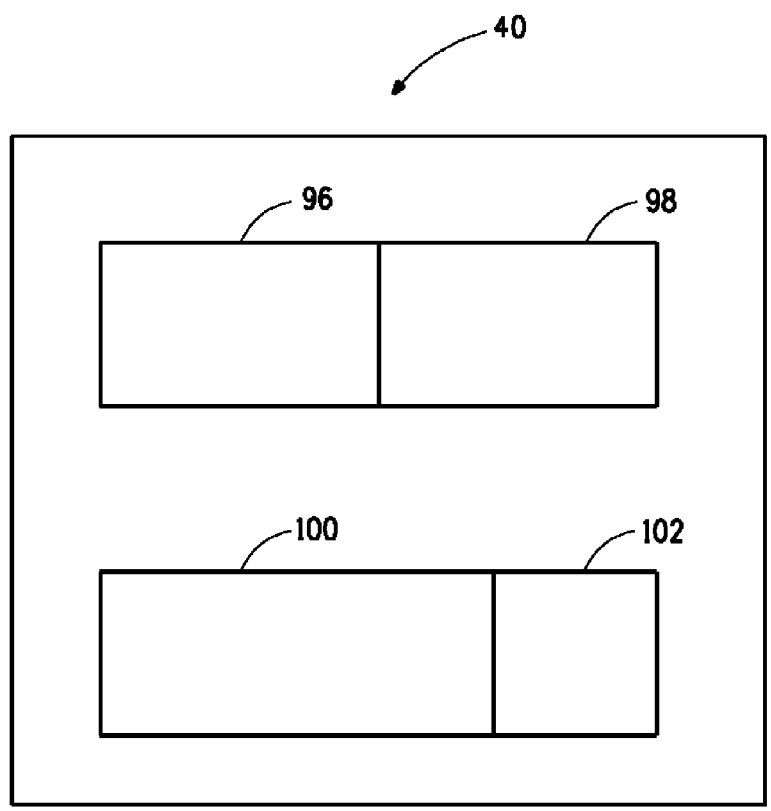

A farm may be operated on a 50-50 share basis with the landlord where tract 96 is the landlords and tract 98 is the producers share. FIG. 4B illustrates where the landlord will only pick up 25 percent of the cost for a burndown herbicide. Land tract 100 shows the producers 75 percent liability and tract 102 shows the landlords 25 percent liability as to the cost for the burndown herbicide.

Figure 5:
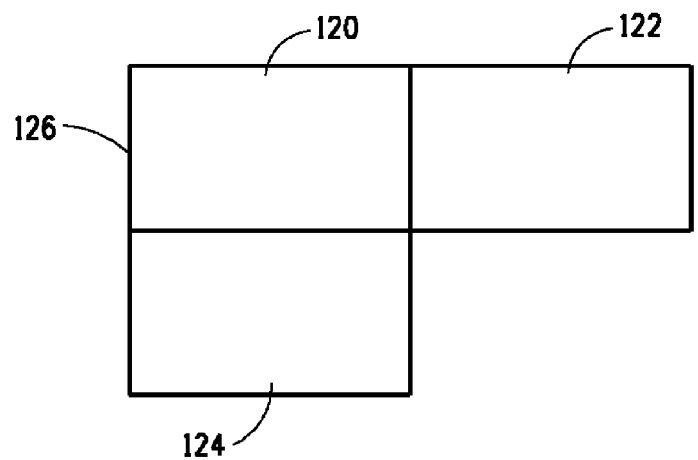
FIG. 5 is an example of multiple production boundaries.

FIG. 5 illustrates an example of the use of multiple production boundaries being combined into a single production boundary such as for a task-specific purpose. In FIG. 5, production boundaries 120, 122, 124 are shown. Different hybrids may be planted within each of these production boundaries 120, 122, 124. The grower may plan to spray the same product mix on each of the crops within these production boundaries 120, 122, 124. Thus, for the task of spraying, the grower may combine each of the fields or boundaries 120, 122, 124 into a single boundary 126. This may be advantageous due to sprayer tank size, airplane application limitations, or other reasons. Thus, multiple production boundaries may provide additional benefits.

Figure 6:
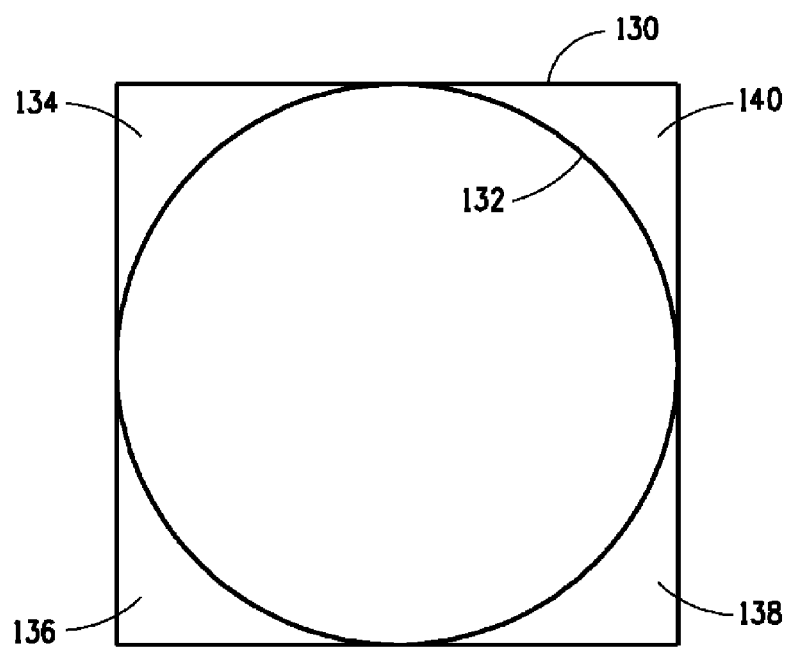
FIG. 6 is another example illustrating multiple boundaries.

FIG. 6 illustrates another example of multiple boundaries. In FIG. 6, a boundary 132 is shown for areas of a field under irrigation. Dry land corners 134, 136, 138, 140 are not under irrigations. The boundary 132 may be used for agronomy and insurance purposes. However, the boundary 130 may be used for planting in a single contiguous operation.

Thus, the use of multiple boundaries for different purposes may be advantageous. This may include the use of multiple production boundaries, and/or regulating boundaries, insurance boundaries, reporting boundaries, or other types of business boundaries.

Thus, various types of boundaries sets may be used for different purposes. In addition, a producer may persistently maintain these boundaries which provides additional advantages to the producer, particular with respect to reporting.

It is to be appreciated that geospatial data may then be combined with boundary information for reporting purposes. For example, a producer may report on the crop yield associated with a particular production boundary. Yield data and accompanying GPS data may be obtained from a yield monitor of a combine. Where the producer is sharing a crop with a landowner, the producer may report on the yield associated with a business boundary associated defined by land owned by the landowner, even though the producer did not farm the land as an individual field. Similarly, for regulatory purposes, a producer may produce a report based on established environmental boundaries regardless of how a field was farmed. The use of multiple boundary sets allows the production data to be used for various types of reporting purposes.

The crop recordkeeping software can perform various functions using the multiple boundary sets and associated data (such as production data). Production data may include GPS data and associated production data (such as associated with harvest, planting, chemical application, and other operations). In addition, production data may include agricultural input data, and financial data associated with production data. Examples of functions which may be performed include, without limitation: reporting yield, moisture, or crop type for a particular boundary; calculating revenue, expenses, or income for a particular boundary; and other functions.

Therefore a crop recordkeeping system and methods have been described. It is to be understood that numerous variations, alternatives, options, are contemplated as one skilled in the art having the benefit of this disclosure would appreciated.

Thus, the present invention is not to be limited to any particular example or embodiment described herein.

What is claimed is:

1. A method comprising:
defining one or more production field boundaries comprising two or more regulatory field boundaries based on differential ownership, wherein the area of land within at least one production field boundary is farmed as one contiguous area of land, and wherein the two or more regulatory field boundaries each fall within the at least one production field boundary;
associating yield data, income or expenses with the at least one production field boundary;
associating a subset of the yield data, income or expenses with the two or more regulatory field boundaries; and
presenting one or more reports comprising the subset of the yield data, income or expenses associated with the two or more regulatory field boundaries.

2. The method of claim 1, wherein the regulatory field boundaries are crop insurance field boundaries.

3. The method of claim 2, wherein the yield data is associated with the two or more crop insurance field boundaries.

4. The method of claim 1, wherein the regulatory field boundaries are environmental compliance field boundaries.

5. The method of claim 4, wherein the yield data is associated with the two or more environmental compliance field boundaries.

6. The method of claim 1, wherein the regulatory field boundaries are government field boundaries.

7. The method of claim 6, wherein the yield data is associated with the two or more government field boundaries.

8. A method comprising:
defining one or more production field boundaries comprising two or more shared expenses field boundaries based on differential ownership, wherein the area of land within at least one production field boundary is farmed as one contiguous area of land, and wherein the two or more shared expenses field boundaries each fall within the at least one production field boundary;
associating yield data, income or expenses with the at least one production field boundary;
associating a subset of the yield data, income or expenses with the two or more shared expenses field boundaries; and
presenting one or more reports comprising the subset of the yield data, income or expenses associated with the two or more shared expenses field boundaries.

9. The method of claim 8, wherein the yield data is associated with the two or more shared expense field boundaries.

10. The method of claim 8, wherein the income and expenses are associated with the two or more shared expense field boundaries.

* * * * *